United States Patent [19]

Tsuboi et al.

[11] 4,204,585
[45] May 27, 1980

[54] CARBURETOR SYSTEM FOR A MULTI-CYLINDER ENGINE OF A MOTORCYCLE

[75] Inventors: Masaharu Tsuboi, Tokorozawa; Urataro Asaka, Kamifukuoka, both of Japan

[73] Assignee: Honda Giken Kogyokabushiki Kaisha, Tokyo, Japan

[21] Appl. No.: 954,295

[22] Filed: Oct. 20, 1978

[30] Foreign Application Priority Data

Oct. 25, 1977 [JP] Japan ................................ 52-127206

[51] Int. Cl.² ............................................. B60K 5/00
[52] U.S. Cl. ................................ 180/219; 123/52 M; 123/52 MC; 123/59 PC; 180/291
[58] Field of Search .................. 180/219; 123/59 PC, 123/52 M, 52 MC

[56] References Cited

U.S. PATENT DOCUMENTS 3,915,249  10/1975  Garside .............................. 180/33 A
4,011,921  3/1977  Sakamoto ........................... 180/33 R Primary Examiner—John P. Silverstrim
Attorney, Agent, or Firm—Haseltine, Lake & Waters

[57] ABSTRACT

An apparatus and method for minimizing the extent of lateral projection of left and right banks of carburetors for a multi-cylinder engine of a motorcyle for accommodating the legs of an operator in which the carburetors are supported rearwards of the engine on a frame beneath a seat for a rider, the carburetors being arranged on opposite sides of the longitudinal axis of symmetry along respective lines which are inclined rearwardly toward the front to form an inverse V-shaped arrangement. The outermost carburetors have lateral bounding planes which are inclined inwardly towards the rear within which a tapered casing of an air cleaner is accommdated. The length of air passages extending from the air cleaner to the inlet ports of the cylinders via the carburetors are equalized for all the cylinders.

11 Claims, 4 Drawing Figures

CARBURETOR SYSTEM FOR A MULTI-CYLINDER ENGINE OF A MOTORCYCLE

FIELD OF THE INVENTION

This invention relates to a carburetor system for a multi-cylinder engine of a motorcyle and other two-wheeled vehicles.

PRIOR ART

In motorcycles of this type, it is known to provide a frame having front and rear wheels and to mount a multicylinder engine on the frame, said engine comprising a plurality of cylinders arranged in lateral direction and provided at the rear thereof with a bank of carburetors arranged in lateral direction and connected to respective cylinders. Said plurality of cylinders and plurality of carburetors are respectively arranged laterally along straight lines parallel to each other.

In such arrangement, the motorcycle becomes relatively large in width, particular when the number of cylinders increases to four or to six and the number of carburetors increases accordingly. As a result, a rider straddling the seat at the rear of a fuel tank located above the bank of carburetors is required to outwardly stretch his legs so that each leg of the rider is generally positioned outside each end of the bank of carburetors. However, to maintain a normal riding position and to ensure the running stability of the motorcycle, it is not desirable that the rider stretch his legs extremely wide apart. In view of this, the bank of carburetors is required to be relatively small in width, which in turn means that the number of carburetors, and hence the number of cylinders, cannot be increased beyond a prescribed number.

SUMMARY OF THE INVENTION

An object of this invention is to provide a system free of such disadvantage.

In accordance with the invention, there is provided a motorcycle having a frame with front and rear wheels with a multi-cylinder engine comprising four, six or other plurality of cylinders arranged in lateral direction and which is provided at the rear thereof with a bank of carburetors comprising four, six or other plurality of carburetors arranged in lateral direction and connected respectively to said cylinders, said plurality of carburetors in the bank of carburetors being located forwardly in the middle and gradually offset rearwardly one by one on each outer side to collectively form substantially an inverse V.

In further accordance with the invention an air cleaner unit is located within an area bounded on the one hand by the respective lines of the right-half and left-half bank of the carburetors and on the other hand by outer bounding planes which extend substantially normal to and intersect said lines respectively on the outermost side of said right-half and left-half bank of carburetors.

DETAILED DESCRIPTION

Figure 1:
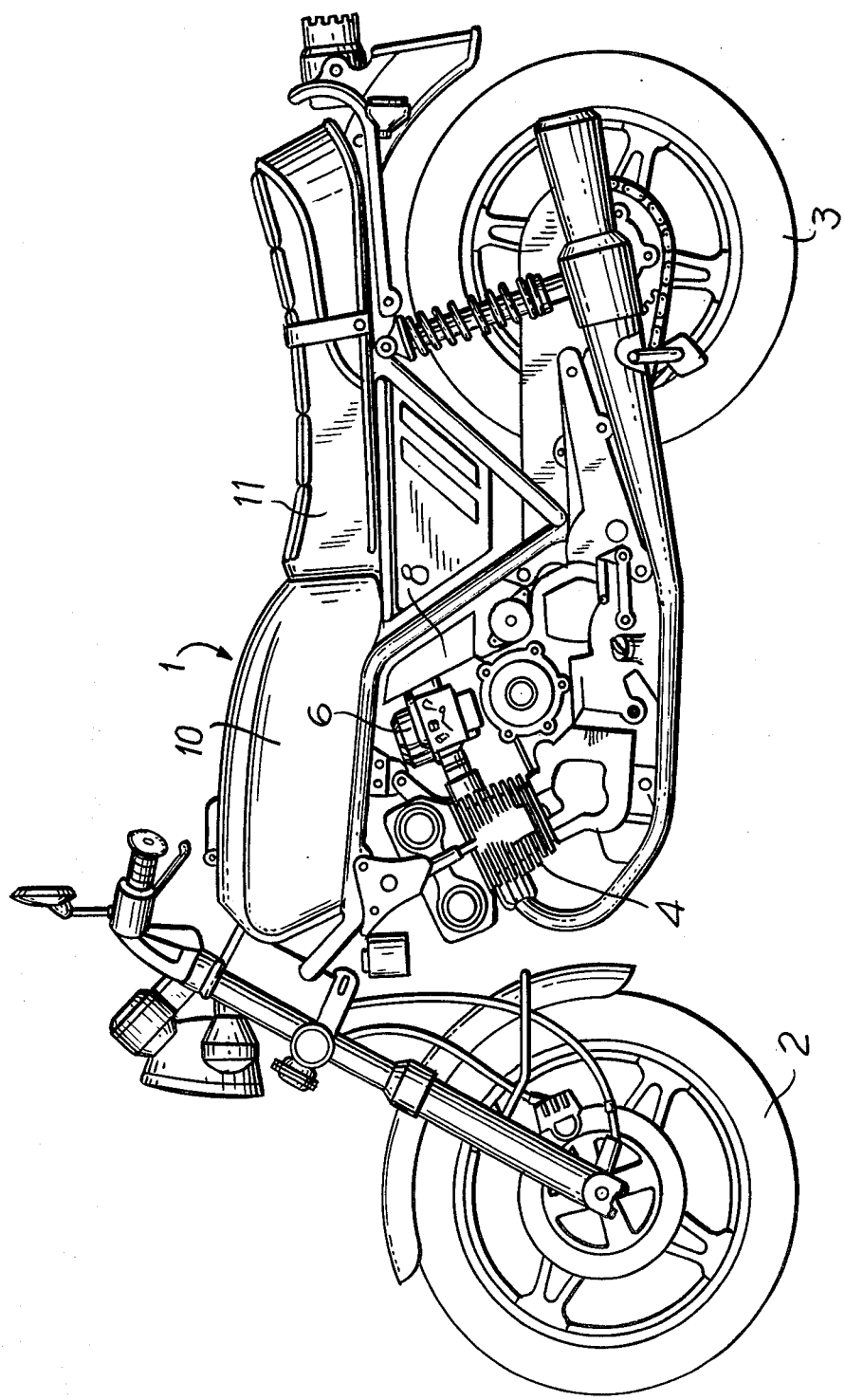
FIG. 1 is a side view of a motorcycle provided with an embodiment according to this invention.
Figure 2:
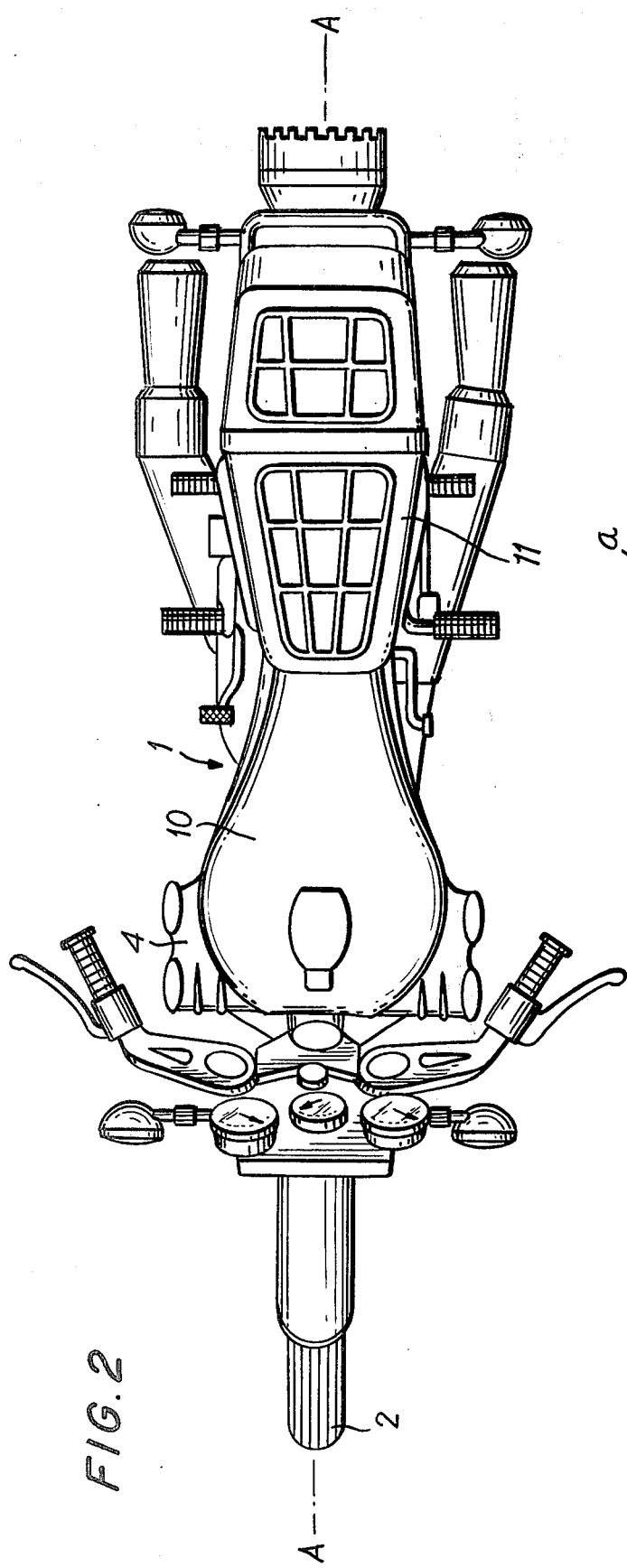
FIG. 2 is a top plan view thereof.
Figure 3:
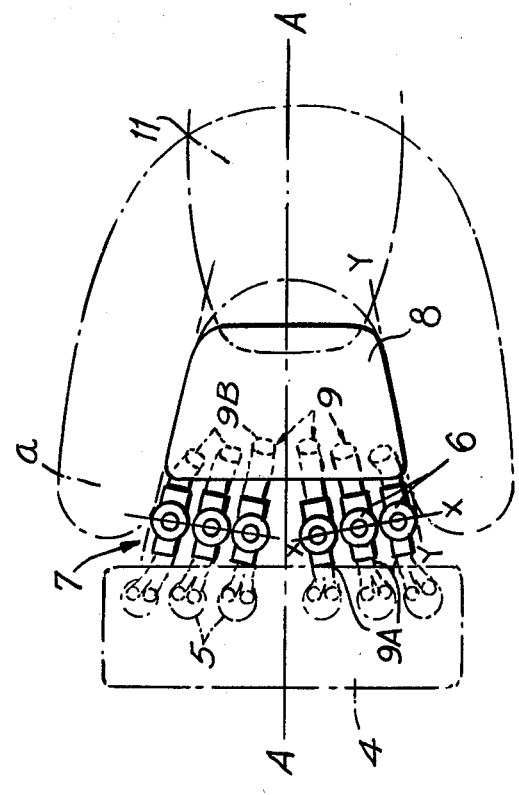
FIG. 3 is a schematic plan view of the main part of the motorcycle with the fuel tank removed.
Figure 4:
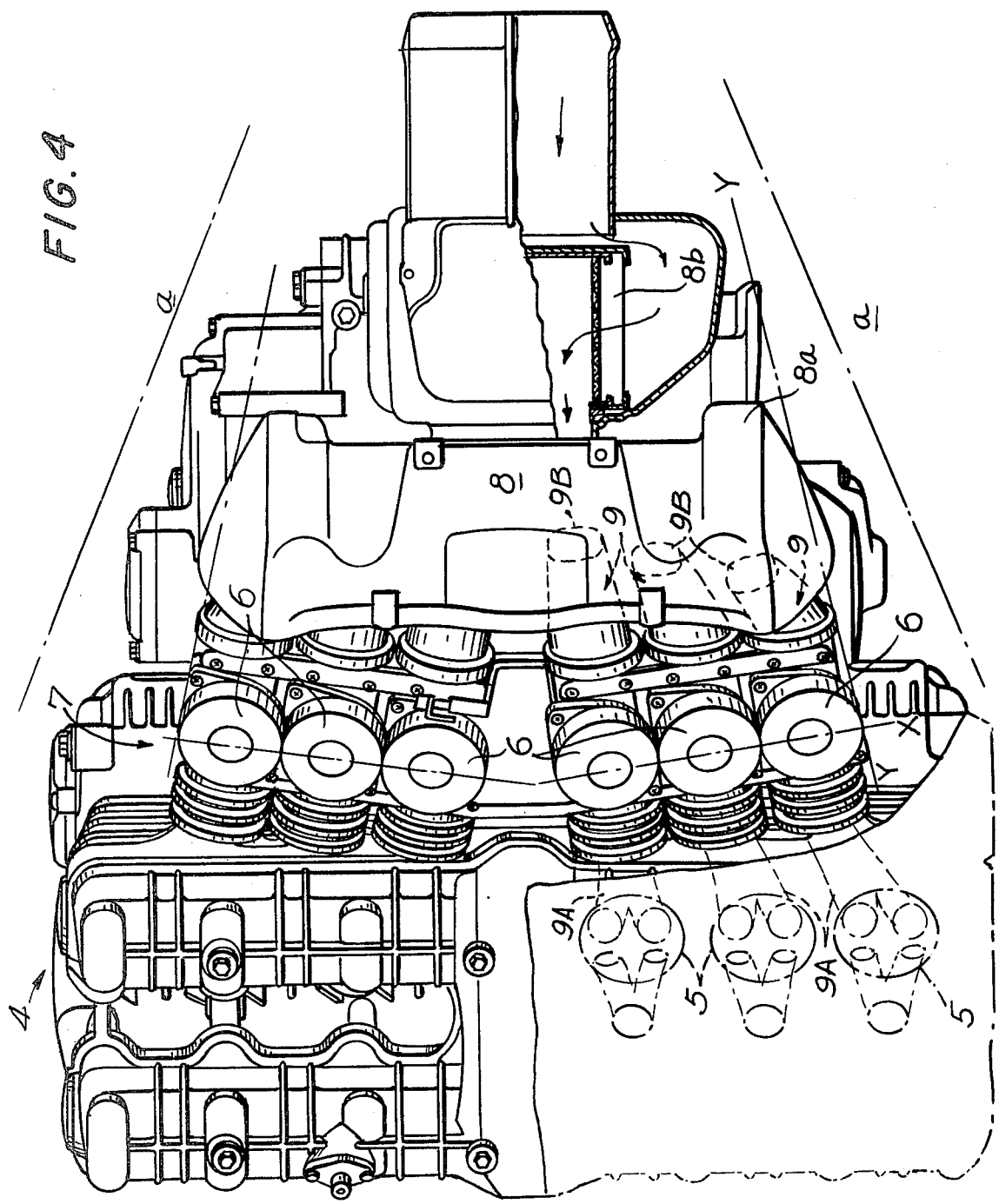
FIG. 4 is a plan view of a fragmentary cross section showing details thereof.

In the drawings there is seen a motorcycle or other two-wheeled vehicle having a frame 1 with a front wheel 2 a rear wheel 3 and an engine 4 mounted between the wheels. The engine 4 is a multi-cylinder engine, and is illustrated in the disclosed embodiment as a six-cylinder engine with the cylinders arranged laterally, i.e. perpendicularly to the longitudinal plane of symmetry A—A of the motorcycle. Mounted at the rear of the cylinders is a plurality of carburetors 6 mounted in a bank 7 and equal in number to the number of cylinder, i.e. six. The carburetors are arranged laterally and an air cleaner 8 is mounted rearwardly of the carburetors so that the cylinders 5 are connected respectively through the carburetors 6 to the air cleaner 8.

A fuel tank 10 is located above the assembly of the engines, carburetors and air cleaner and a seat 11 for a rider is located at the rear of the engine so that the legs "a" of the rider straddling the seat extend when viewed from above, from outside the air cleaner 8 to outside the bank 7 of carburetors.

The six cylinders 5 in the six-cylinder engine 4 are arranged, when viewed from above, laterally in a straight line perpendicular to the longitudinal plane of symmetry A—A, whereas the six carburetors 6 in the bank 7 of carburetors are arranged so that the two central or innermost carburetors are located forwardly and those on each outer side are located progressively rearwards one by one along lines X—X to form, when viewed from above, the shape of an inverse V. The air cleaner 8 located at the rear of the bank 7 of carburetors is placed within an area confined by the respective lines X—X of the right-half and left-half of said bank 7 of carburetors and the planes Y—Y which are respectively substantially normal to and intersect lines X—X at each outermost side of the right-half and left-half of the bank 7 of carburetors. Consequently, the bank 7 of carburetors is reduced in width as a whole as compared to the arrangement in which the six carburetors 6 are arranged laterally on a straight line and wherein in both arrangements the carburetors are substantially in contact with one another in each of the left and right halves of the bank 7. Stated otherwise, when the carburetors are located as close to one another as possible (substantially in contact) there is a reduction in overall lateral extent by arranging the carburetors along inclined lines X—X as compared to the conventional arrangement where the line of carburetors extends perpendicular to the longitudinal plane of symmetry of the motorcycle.

Furthermore, in the arrangement according to the invention, the carburetors are inclined inwardly towards the rear whereby due to the combination of the reduced width and the inclined relation of the carburetors the bank of carburetors can now be readily accommodated between the legs "a" of a rider.

The carburetors 6 open into a cleaner chamber 8a in the air cleaner 8 located at the rear thereof, the casing of the cleaner being gradually narrower in width as it extends to the rear. Thus, the entire arrangement is made to be accommodated in the V-shaped space between the legs "a" of the rider. In the drawings, 8b shows a cleaner element in the cleaner 8 on the inlet side.

In further accordance with this invention, there are six intake passages 9 each connecting a respective cylinder 5 to the air cleaner 8 through carburetor 6, each passage 9 being substantially equal in length to the other passages. More specifically, each passage 9 extends from a valve port provided in the engine to the end of a portion at the rear of the carburetor which extends to the air cleaner, the overall length of passages 9 being substantially equal for the carburetors. More specifically, each passage 9 comprises a first part 9A for airfuel mixture extending from the inlet port of a respective cylinder to its associated carburetor and a second part 9B for inlet air extending from the air cleaner to the inlet of the respective carburetor. The length of the parts 9A and 9B are adjusted for the passages 9 to substantially equalize the overall length of the passages 9. Namely, since the carburetors are disposed on inclined lines X—X, the length of parts 9A progressively increases for the laterally outer carburetors. In order to compensate for this, the parts 9B are elongated in length in reverse order, namely, they are progressively increased in length from the outermost to the innermost carburetor in each bank.

This provides smooth engine operation and high output characteristics by making the intake efficiencies of the cylinder uniform with respect to engine speed while making the settings of each carburetor the same.

As seen from the foregoing, in accordance with this invention the bank of carburetors located at the rear of the engine is substantially arranged in the shape of an inverse V in which the central carburetors are located forwardly and the carburetors on each outer side are located gradually rearward one by one, the air cleaner casing located at the rear of said bank of carburetors being arranged substantially in the shape of a V with its apex pointing rearwardly whereby the entire assembly is made relatively compact in width and can be accommodated within the relatively narrow space between the legs of a rider while the intake efficiencies of the cylinders are rendered uniform to ensure soomth engine operation and high output characteristics, enabling the motorcycle to be provided with an engine having six cylinders and six carburetors.

Although the invention has been described in connection with a preferred embodiment thereof it would be obvious to those skilled in the art that numerous modifications and variations can be made within the scope and spirit of the invention as defined in the attached claims.

What is claimed is:

1. In a motorcycle having a frame with front and rear wheels, a multicylinder engine mounted on the frame between the wheels, a plurality of carburetors equal in number to the number of cylinders of the engine and respectively operatively connected thereto, the cylinders of the engine extending laterally in an arrangement of at least two cylinders on each side of a longitudinal axis through the frame, the carburetors being disposed rearwardly of the cylinders, and an air cleaner disposed rearwardly of the carburetors, the improvement wherein said carburetors are arranged in two banks on opposite sides of the longitudinal axis within the confines of the lateral extent of the engine, the carburetors in each bank extending along respective lines which are inclined inwardly toward the front to form an inverse V-shaped arrangement, and means connecting the air cleaner to the respective carburetors.

2. The improvement as claimed in claim 1 wherein said carburetors in each bank extend parallel to one another.

3. The improvement as claimed in claim 1 wherein the carburetors in each bank are substantially in contact with one another and are rearwardly displaced in relation to their lateral distance from said longitudinal axis.

4. The improvement as claimed in claim 3 wherein the outermost carburetors in said bank have lateral bounding planes extending substantially perpendicular to the respective inclined lines of said carburetors, said air cleaner being substantially confined within said lateral bounding planes.

5. The improvement as claimed in claim 4 wherein said air cleaner comprises a casing which tapers rearwardly in narrowing extent.

6. The improvement as claimed in claim 1 comprising a plurality of inlet pipe means connecting each of the cylinders to said air cleaner via respective carburetors, said inlet pipe means having substantially equal lengths.

7. The improvement as claimed in claim 6 wherein each inlet pipe means comprises pipes connecting the air cleaner to respective carburetors, the length of said pipes being reduced for successive carburetors progressing laterally outwards in each bank.

8. The improvement as claimed in claim 1 wherein said carburetors in each bank are three in number which are progressively rearwardly displaced in relation to their lateral distance from said longitudinal axis.

9. The improvement as claimed in claim 8 wherein said longitudinal axis is a longitudinal median axis of said frame, said banks of carburetors being symmetrically arranged on opposite sides of said longitudinal axis.

10. The improvement as claimed in claim 9 wherein the outermost carburetors in said banks have lateral bounding planes extending substantially perpendicular to the respective lines passing through the carburetors.

11. A method of minimizing the extent of lateral projection of left and right banks of carburetors for a multicylinder engine of a motorcycle for accommodating the legs of an operator, the carburetors being supported rearwards of the engine on a frame beneath a seat for a rider, said method comprising positioning the carburetors substantially in abutment with one another in the left and right banks on opposite sides of a longitudinal axis of symmetry of the motorcycle in progressively offset relation longitudinally rearwards from a transverse axis such that the carburetors are disposed along respective lines which are inclined inwardly towards the front to form an inverse V-shaped arrangement in which the outermost carburetors have lateral bounding planes which are angulated to accommodate the legs of the operator, shaping an air cleaner to taper rearwardly in narrowing manner to fit the air cleaner rearwards of the carburetors within the extent of said lateral bounding planes, and connecting the air cleaner to the cylinders of the engine via the respective carburetors with passages that are made substantially equal to one another.

* * * * *